United States Patent
Asnaashari et al.

(10) Patent No.: US 8,954,658 B1
(45) Date of Patent: Feb. 10, 2015

(54) METHOD OF LUN MANAGEMENT IN A SOLID STATE DISK ARRAY

(71) Applicant: Avalanche Technology, Inc., Fremont, CA (US)

(72) Inventors: Mehdi Asnaashari, Danville, CA (US); Siamack Nemazie, Los Altos Hills, CA (US); Ruchirkumar D. Shah, San Jose, CA (US)

(73) Assignee: Avalanche Technology, Inc., Fremont, CA (US)

( * ) Notice: Subject to any disclaimer, the term of this patent is extended or adjusted under 35 U.S.C. 154(b) by 0 days.

(21) Appl. No.: 14/090,910

(22) Filed: Nov. 26, 2013

Related U.S. Application Data

(63) Continuation-in-part of application No. 14/040,280, filed on Sep. 27, 2013, which is a continuation-in-part of application No. 14/050,274, filed on Oct. 9, 2013, which is a continuation-in-part of application No. 14/073,669, filed on Nov. 6, 2013.

(51) Int. Cl.
G06F 12/06 (2006.01)
G06F 12/10 (2006.01)
G06F 3/06 (2006.01)

(52) U.S. Cl.
CPC .......... *G06F 12/1009* (2013.01); *G06F 3/0604* (2013.01); *G06F 3/0659* (2013.01); *G06F 3/0688* (2013.01)
USPC .......................................... 711/103; 711/202

(58) Field of Classification Search
USPC ......................................................... 711/103
See application file for complete search history.

(56) References Cited

U.S. PATENT DOCUMENTS

| | | | |
|---|---|---|---|
| 8,086,652 B1 * | 12/2011 | Bisson et al. | 707/823 |
| 2012/0166748 A1 * | 6/2012 | Satoyama et al. | 711/165 |

* cited by examiner

*Primary Examiner* — Kenneth Lo
(74) *Attorney, Agent, or Firm* — Maryam Imam; IPxLaw Group LLP

(57) ABSTRACT

A method of managing logical unit numbers (LUNs) in a storage system includes identifying one or more LUN logical block address (LBA)-groups being affected. The one or more LUN LBA-groups defining a LUN. The method further determining the existence of an association of each of the affected LUN LBA-groups to a portion of a storage pool and maintaining a mapping table to track the association of the LUN LBA-groups to the storage pool.

21 Claims, 12 Drawing Sheets

METHOD OF LUN MANAGEMENT IN A SOLID STATE DISK ARRAY

CROSS-REFERENCE TO RELATED APPLICATIONS

This application is a continuation-in-part of U.S. patent application Ser. No. 14/040,280, filed on Sep. 27, 2013, by Mehdi Asnaashari, and entitled "STORAGE PROCESSOR MANAGING SOLID STATE DISK ARRAY" and a continuation-in-part of U.S. patent application Ser. No. 14/050,274, filed on Oct. 9, 2013, by Mehdi Asnaashari et al., and entitled "STORAGE PROCESSOR MANAGING NVME LOGICALLY ADDRESSED SOLID STATE DISK ARRAY" and a continuation-in-part of U.S. patent application Ser. No. 14/073,669, filed on Nov. 6, 2013, by Mehdi Asnaashari et al., and entitled "STORAGE PROCESSOR MANAGING SOLID STATE DISK ARRAY", the disclosures of both of which are incorporated herein by reference as though set forth in full.

BACKGROUND OF THE INVENTION

1. Field of the Invention

This invention relates generally to solid state disks and particularly to usage schemes used by solid state disks.

2. Description of the Prior Art

With the advent of the popularity of solid state drives (SSDs) and exponential growth of network content, the emergence of all-flash storage systems such as, SSD arrays, or storage appliances has been realized. These systems or appliances are mostly network attached storage (NAS) or storage attached network (SAN) with a high-speed, high bandwidth network such as a 10 Giga bit Ethernet (10 GbE). These storage units typically include arrays of one or more SSDs to meet the requisite capacity and performance.

Blocks of data are typically identified by a logical block address (LBA) from a host that uses the SSDs to store and/or read information. Logical units (LUN) are associated with LBAs. Using the host-provided LBA and LUN, locations in the SSDs are identified for storage of information. In systems using SSDs that are accessible to multiple users, the information in the SSDs needs to be organized in a way as to delineate space assigned to each user.

It is possible, and in fact, commonplace for users to require more storage space than initially assigned. For example, a user may have been initially assigned a space of 10 Giga bytes (Gb) and at some time in the future, required another 5 or 10 or 20 Gb. Currently, this is handled by writing the contents of the SSDs to another location, reformatting the SSDs and then assigning the desired additional space to the user. In this manner, the user is assigned its initial space and added space in a contiguous fashion in the SSDs. For example, an initial space of 10 Gb is immediately followed by the additional space in the SSDs. The user is unaware of how the additional space is identified and assigned for it in the SSDs. For instance, whether the additional space is in contiguous with the prior-assigned space remains unknown to the user, nor does the user care to know this information.

The problem with the foregoing is the steps required before being able to allocate additional space in that re-writing and formatting undesirably consume time and resources and can render the SSDs unusable to all of the other users when even in the case where one user resizes its storage size. A similar problem exists when a user no longer requires the initial assigned space and wishes to reduce this space by removing LBAs. Stated differently, existing LUN resizing, deletion, or migration require formatting of the entire memory array (or storage pool) because they allocate only consecutive LBAs within the array to LBAs associated with a LUN. This problem is exaggerated even more as the capacity of the SSDs grows larger and the number of users per SSDs increases.

Thus, there is a need for a storage appliance with improved LUN management scheme.

SUMMARY OF THE INVENTION

Briefly a method of managing logical unit numbers (LUNs) in a storage system includes identifying one or more LUN logical block address (LBA)-groups being affected. The one or more LUN LBA-groups defining a LUN. The method further determining the existence of an association of each of the affected LUN LBA-groups to a portion of a storage pool and maintaining a mapping table to track the association of the LUN LBA-groups to the storage pool.

These and other objects and advantages of the invention will no doubt become apparent to those skilled in the art after having read the following detailed description of the various embodiments illustrated in the several figures of the drawing.

IN THE DRAWINGS

FIG. 1 shows, a storage system (or "appliance") 8, in accordance with an embodiment of the invention.

FIG. 2 shows LUN tables 200 including the LUN table pointer 202 and the LUN mapping table 204.

FIG. 3 shows an example 300 of a storage pool free LBA-group queue 300, typically constructed during the initial installation of the storage pool 26.

Figure 8:
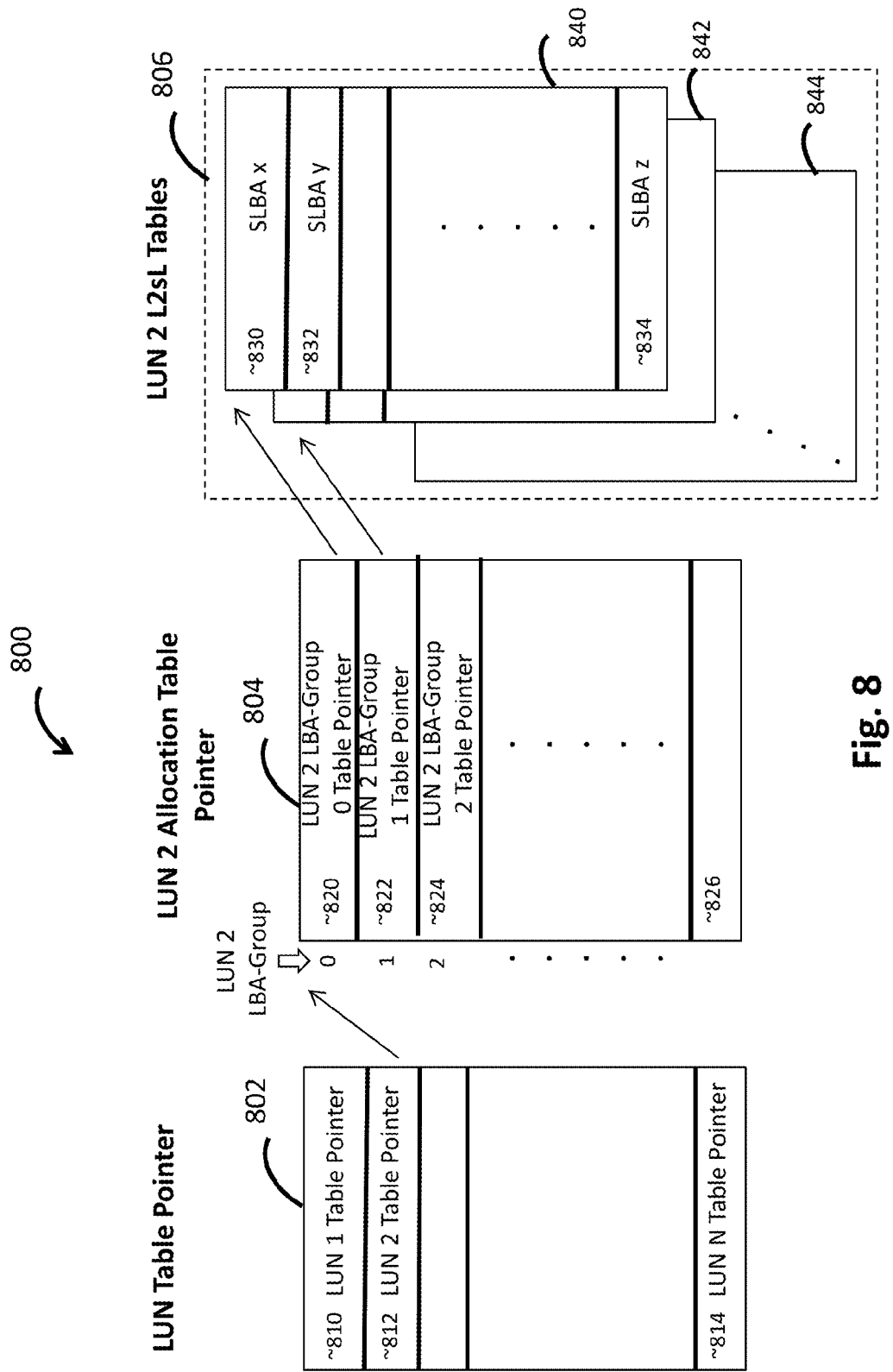

FIG. 8 shows exemplary tables 800, analogous to the tables 600 except that the tables 800 also include an allocation table.

FIGS. 9-12 each show a flow chart of a process performed by the CPU subsystem 14, in accordance with methods of the invention.

DETAILED DESCRIPTION OF THE VARIOUS EMBODIMENTS

In the following description of the embodiments, reference is made to the accompanying drawings that form a part hereof, and in which is shown by way of illustration of the specific embodiments in which the invention may be practiced. It is to be understood that other embodiments may be utilized because structural changes may be made without departing from the scope of the invention. It should be noted that the figures discussed herein are not drawn to scale and thicknesses of lines are not indicative of actual sizes.

A method of managing logical unit numbers (LUNs) in a storage system is disclosed. One of the methods of the invention includes identifying one or more LUN logical block address (LBA)-groups being affected, the one or more LUN LBA-groups defining a LUN, assigning each of the affected LUN LBA-groups to a portion of a storage pool, and maintaining a mapping table to track the assignment or association of the LUN LBA-groups to the storage pool. The mapping table allows fragmented or non-contiguous portions of the storage pool to be assigned to the LBA-groups of a LUN while these non-contiguous portions appear to the host to be in a contiguous portion of the storage pool.

Figure 1:
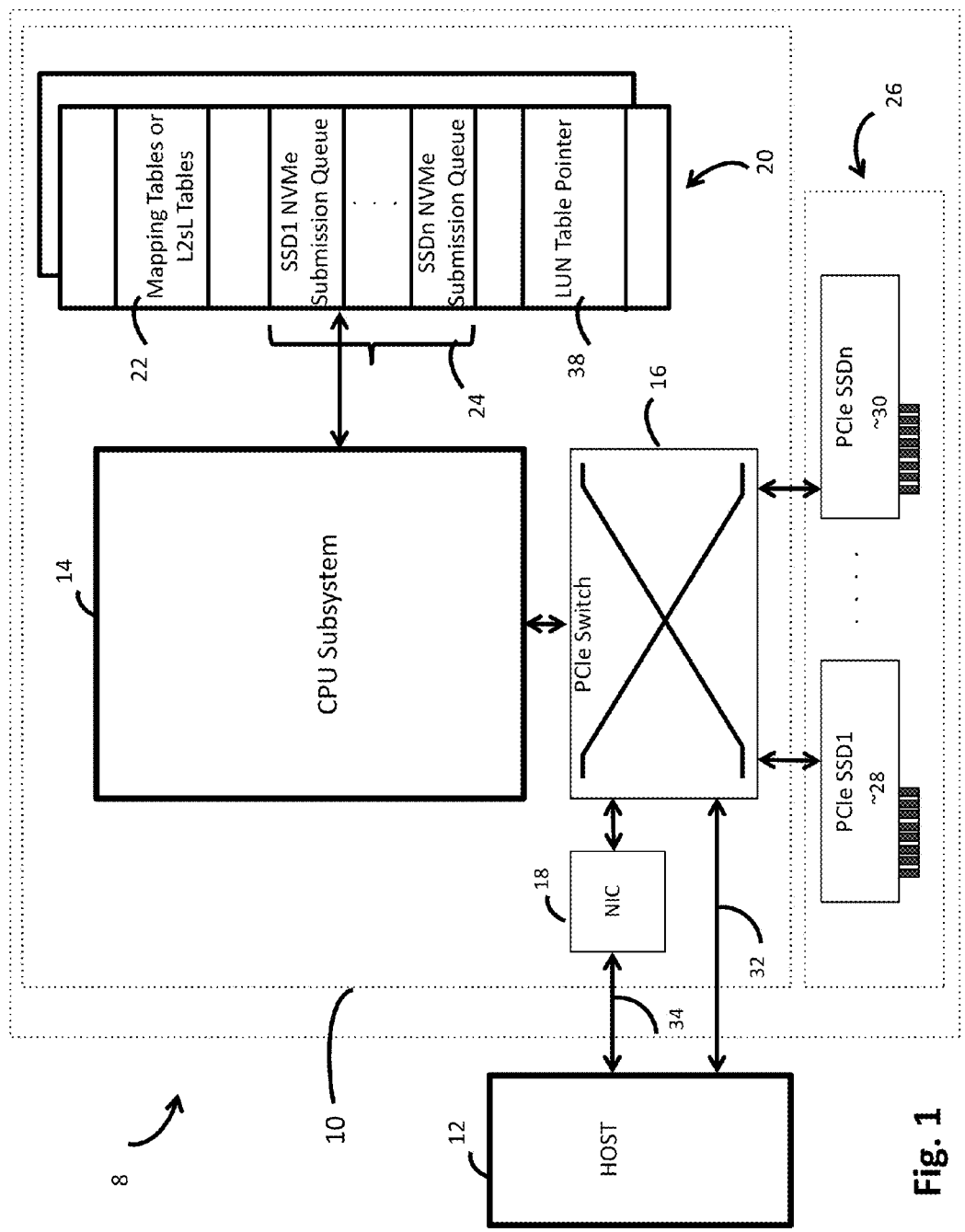

Referring now to FIG. 1, a storage system (or "appliance") 8 is shown in accordance with an embodiment of the invention. The storage system 8 is shown to include storage processor 10 and a bank of solid state drives (SSDs) creating a storage pool 26. The bank of SSDs is made of one or more SSDs. The storage system 8 is shown coupled to a host 12. The storage pool 26 of the storage system 8 is shown to be a Peripheral Component Interconnect Express (PCIe) solid state disks (SSDs).

The storage processor 10 is shown to include a CPU subsystem 14, a PCIe switch 16, a network interface card (NIC) 18, and memory 20. The memory 20 is shown to include mapping tables or ("L2sL tables") 22, PCIe SSD NVMe submission queues 24, and LUN table pointer 38. The storage processor 10 is further shown to include an interface 34 and an interface 32.

The host 12 is shown coupled to the NIC 18 through the interface 34 and/or coupled to the PCIe switch 16 through the interface 32. The PCIe switch 16 is shown coupled to the bank of PCIe SSDs creating the storage pool 26. The PCIe switch 16 is shown coupled to the storage pool 26. The storage pool 26 is shown to include 'n' number of PCIe SSDs or PCIe SSD 28 through PCIe SSDn 30 with the understanding that the storage pool 26 may have additional SSDs than that which is shown in the embodiment of FIG. 1. "n" is an integer value. The PCIe switch 16 is further shown coupled to the NIC 18 and the CPU subsystem 14. The CPU subsystem 14 is shown coupled to the memory 20. It is understood that the memory 20 may and typically does store additional information, not depicted in FIG. 1.

In an embodiment of the invention, the bank of SSDs 26 are PCIe SSDs. It is contemplated that other suitable types of SSDs, such as but not limited to, serial ATA (SATA) or serial-attached SCSI (SAS) in combination with port multiplier may be employed.

In an embodiment of the invention, parts or all of the memory 20 is volatile, such as dynamic random access memory (DRAM). In other embodiments, parts or all of the memory 20 is non-volatile, such as flash, magnetic random access memory (MRAM), spin transfer torque magnetic random access memory (STTMRAM), resistive random access memory (RRAM), or phase change memory (PCM). In still other embodiments, the memory 20 is made of both volatile and non-volatile memory. It is desirable to save the mapping tables (also referred to herein as "L2sL tables") 22 and the table 38 in non-volatile memory so as to maintain the information that is saved therein even when power is not applied to the memory 20. As will be evident shortly, maintaining the information in memory at all times is of particular importance because the information maintained in the tables 22 and 38 is needed for proper operation of the storage system subsequent to a power interruption.

During operation, the host 12 issues a read or a write command, along with data in the case of the latter. Information from the host is normally transferred between the host 12 and the processor 10 through the interfaces 32 and/or 34. For example, information is transferred through the interface 34 between the processor 10 and the NIC 18. Information between the host 12 and the PCIe switch 16 is transferred using the interface 32 and under the direction of the of the CPU subsystem 14.

In the case where data is to be stored, i.e. a write operation is consummated, the CPU subsystem 14 receives the write command and accompanying data, for storage, from the host through the PCIe switch 16, under the direction of the CPU subsystem 14. The received data is ultimately saved in the memory 20. The host write command typically includes a starting LBA and the number of LBAs (sector count) that the host intends to write to as well as the LUN. The starting LBA in combination with sector count is referred to herein as "host LBAs" or "host-provided LBAs". The storage processor 10 or the CPU subsystem 14 maps the host-provided LBAs to the storage pool 26.

In the discussions and figures herein, it is understood that the CPU subsystem 14 executes code (or "software program (s)") to perform the various tasks discussed. It is contemplated that the same may be done using dedicated hardware or other hardware and/or software-related means.

Capacity growth of the storage pool 26, employed in the storage system 8, renders the storage system 8 suitable for additional applications, such as without limitation, network attached storage (NAS) or storage attached network (SAN) applications that support many logical unit numbers (LUNs) associated with various users. The users initially create LUNs with different sizes and portions of the storage pool 26 that are allocated to each of the LUNs.

The storage processor 10 allocates portions of the storage pool 26 to each LUN and maintains this relationship between the storage pool and each LUN in a mapping table 22. The size of one or more LUNs may increase or decrease based on the users' needs and the desired applications to be employed. Furthermore, a user may decide to reduce its allocated storage space or would like to move (migrate) its storage to another appliance that is better suited for its application and input/output (I/O) requirements. To easily accommodate LUN resizing by avoiding the challenges and difficulties associated therewith, the sizes of LUNs are maintained at some granularity referred to herein as "LUN LBA-group granularity". A LUN may have one or more LUN LBA-groups. LUNs are only allowed to be created or resized at a LUN LBA-group granularity. Portions of the storage pool 26 allocated or assigned to each LUN are also at the same LUN LBA-group granularity. The mapping table 22 managed by the storage processor 10, maintains the relationship between the storage pool LBA-groups and the LUN LBA-group. "Storage pool LBA-groups" as used herein refers to the groups of LBAs in the storage pool 26 and has the same granularity as the LUN LBA-group granularity.

Referring back to the above example of a write command from the host, the storage processor 10 identifies one or more storage pool LBA-groups being added (assigned) or removed (unassigned) and updates the mapping table 22 accordingly. Similarly, the storage processor 10 identifies one or more LUN LBA-groups being affected, such as being added, removed, or migrated.

The mapping by the storage processor 10 is better explained by use of examples cited below. It is worth noting that this mapping scheme allows growth of the space allocated to a user, in a multi-user setting, to occur without the need for moving data to a temporary location and re-mapping and moving the data back, as done by prior art methods. The same holds true for deleting LBAs from a logical unit number (LUN).

In cases where LBAs associated with a command spans across more than one LUN LBA-group, the command is broken up at the LBA-group boundary with each divided portion being a part of a distinct LUN LBA-group.

In an embodiment of the invention, the affected LUN LBA-groups, an example of which is LUN LBA-groups being added, need not be assigned to a contiguous portion of the storage pool 26, rather, they may be, at least in part, assigned to one or more non-contiguous portions of the storage pool 26. But, while the affected LUN LBA-groups or any portions thereof are assigned to a non-contiguous portion of the storage pool 26, to the host 12, they appear to be assigned to a contiguous portion of the storage pool 26.

Figure 2:
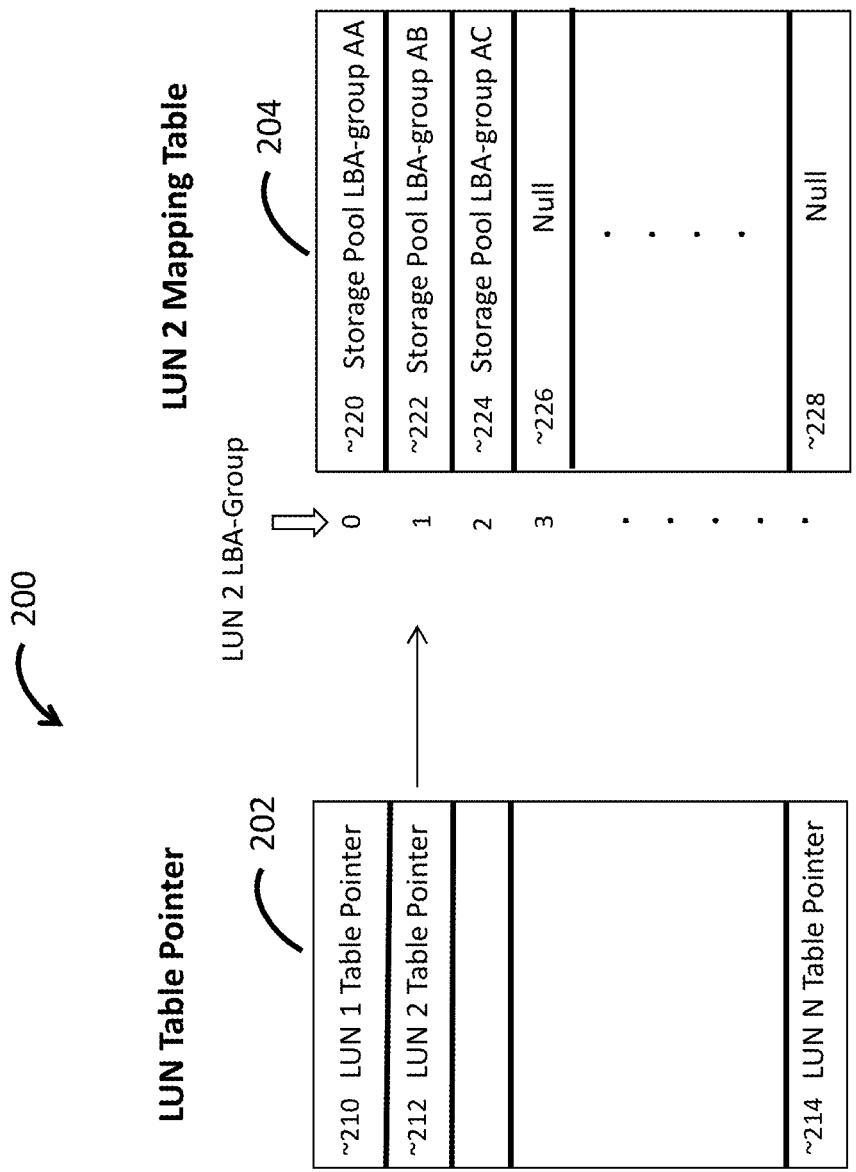

FIG. 2 shows LUN tables 200 including the LUN table pointer 202 and the LUN 2 mapping table 204. The table 202 includes LUN table pointers that each entry point to a memory location within the memory 20, where the mapping table of the associated LUN resides. When a LUN is created, storage processor 10 allocates a portion of the memory 20 to the mapping table 204 that is associated with a particular LUN and updates the LUN table pointer associated with the particular LUN with the starting location of the mapping table 204. The storage processor 10 then computes the number of LUN LBA-groups based on the size of the LUN being created and as the size of the LBA-group, and identifies and assigns a portion of the storage pool 26 to each LUNs LBA-group. The table 204 tracks or maintains the relationship between the portions of the storage pool, also herein referred to as "storage pool LBA-groups" and LUN LBA-groups. The mapping table 204 is indexed by the LUN LBA-groups and each entry of mapping table 214 includes the storage pool LBA-group assigned to that LUN LBA-group.

Storage processor 10 tracks the association of the storage pool LBA-groups with the LUN LBA-groups by updating the mapping tables, such as the mapping table 204, when LBA-groups are added or removed from a LUN. When LBA-groups are removed from a LUN, the storage processor 10 identifies storage pool LBA-groups associated with the LUN LBA-groups and disassociates (or "unassigns") the identified storage pool LBA-groups from the removed LUN LBA-groups and updates the mapping table 204 accordingly.

LUNs can also be added to or removed from the storage system 8. In the case when a LUN is created, a corresponding mapping table, such as mapping table 204, is also created, and in the case when a LUN is removed, its corresponding mapping table, such as mapping table 204, is also removed.

In an embodiment of the invention, the number of rows or entries of the mapping table 204 depends on the maximum number of LBA-groups that the storage processor 10 has to maintain for a LUN and is further based on the maximum size of the LUN allowed by the storage system 8 and the size of the LUN LBA-groups.

In some embodiment of the invention, to reduce the size of the memory that comprises the mapping tables, the size of the mapping table may be based on the actual size of the LUN being created. If the LUN grows in size with time, the storage processor 10 may then allocate a larger memory space for the LUN to accommodate the LUN in its entirety, move the content of the previous mapping table to a new mapping table, and update the mapping table starting address in the mapping table pointer accordingly.

In another embodiment of the invention, storage processor 10 may create a second mapping table when a LUN grows in size where the second mapping table has enough entries to accommodate the growth in the size of the LUN in which case, the first and second mapping tables are linked together.

In the example of FIG. 2, the table pointer for LUN 2, or LUN 2 table pointer 212 points to the location of mapping table for LUN 2 in memory 20. In this example, LUN 2 was created having 3 LBA-groups; LBA-group 0, 1, and 2. Storage processor 10 identifies 3 free LBA-groups AA, AB, and AC from the storage pool 26 and assigns them to LUN 2 LBA-group 0, 1, and 2 respectively. The relationship or association between storage pool LBA-groups and LUN2 LBA-groups are maintained in the mapping table 204. The rows of the table 204 are indexed by the LUN 2 LBA-group, and not by the storage pool LBA-groups, in the table 204. The LUN LBA-groups are host-provided LBA-groups whereas the storage pool LBA-groups are LBA-groups of the storage pool 26. This is further discussed below. The pointer in the row 210 of the table 202 points to the starting location of the table 204.

Figure 5:
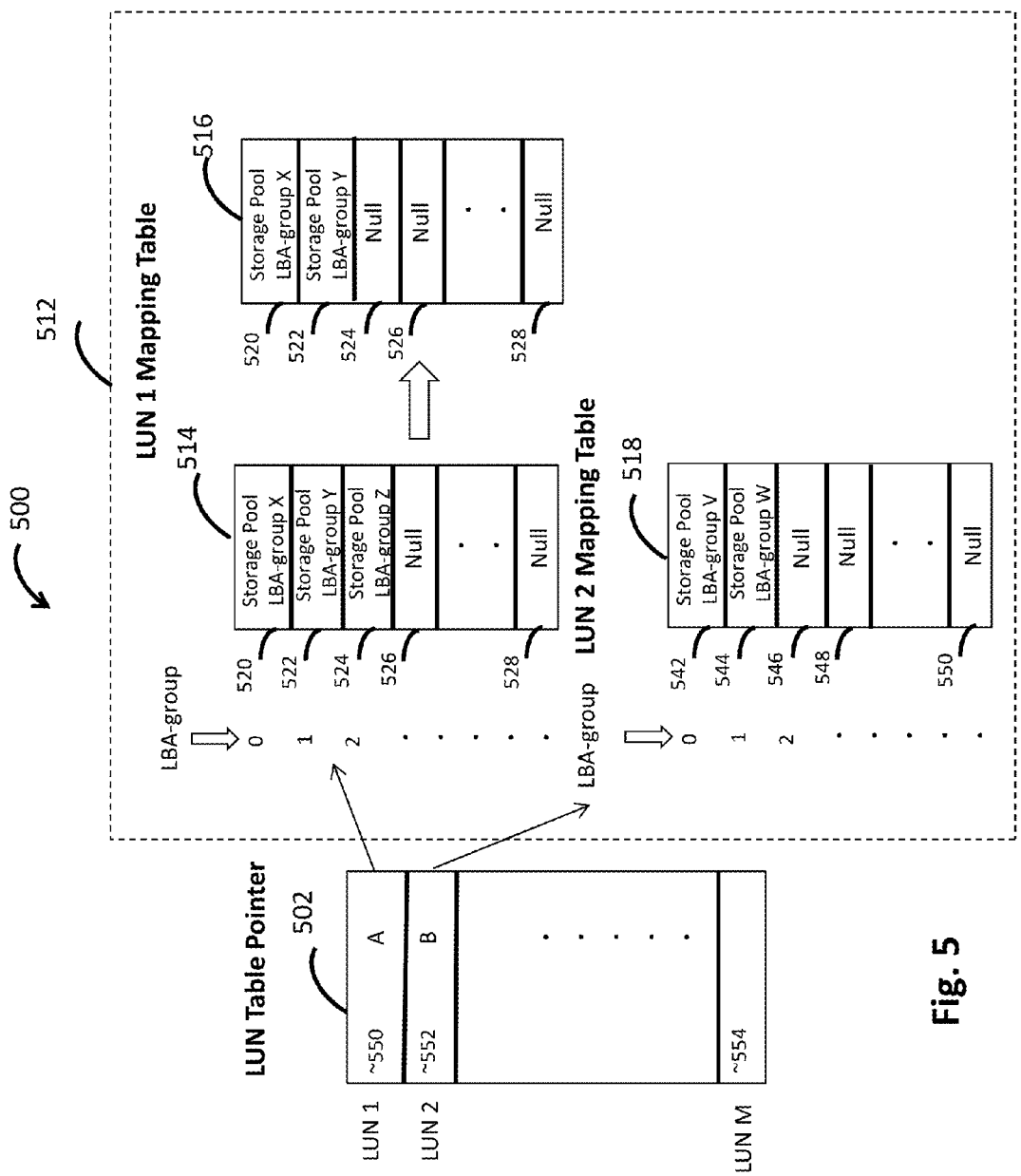
FIG. 5 shows LUN table pointer and LUNs mapping table for the example of FIGS. 3 and 4.

The contents of each of the rows of the table 204, such as rows 220-228 is a storage pool LBA-group number identifying the location of the LBAs in the bank of SSDs of storage pool 26, for LUN 2. The contents of the rows of the table 204 are each also referred to herein as "storage pool LBA-group number". For instance, going back to the example of LUN 2, the rows 220-226 each identify a location within the storage pool 26 where each of the LBA-groups for LUN 2 is located. The LBA-group number 'AA' in the storage pool 26 is assigned to LUN 2 LBA group 0 and saved in the row 220, the LBA-group number 'AB' in the storage pool 26 is assigned to LUN 2 LBA group 1 and saved in the row 222, and so on. 'Null' value in the mapping table indicates that no LBA-group from the storage pool is assigned to the LUN LBA-group. A further example of this is shown in FIG. 5.

In one embodiment of the invention, the storage processor 10 allocates a portion of the storage pool 26 corresponding to the number of LUN LBA-groups being created or added and assigns free storage pool LBA-groups to the LUN LBA-groups. In other embodiment of the invention, the storage processor 10 allocates a portion of storage pool corresponding to the number of LUN LBA-groups being created or added but does not assign any specific storage pool LBA-groups to the LUN LBA-groups. It will assign storage pool LAB-groups to the LUN LBA-groups when the LUN LBA-groups are being written to.

The tables 200 may reside in the memory 20. In some embodiments of the invention, these tables may reside in the non-volatile portion of the memory 20.

Figure 3:
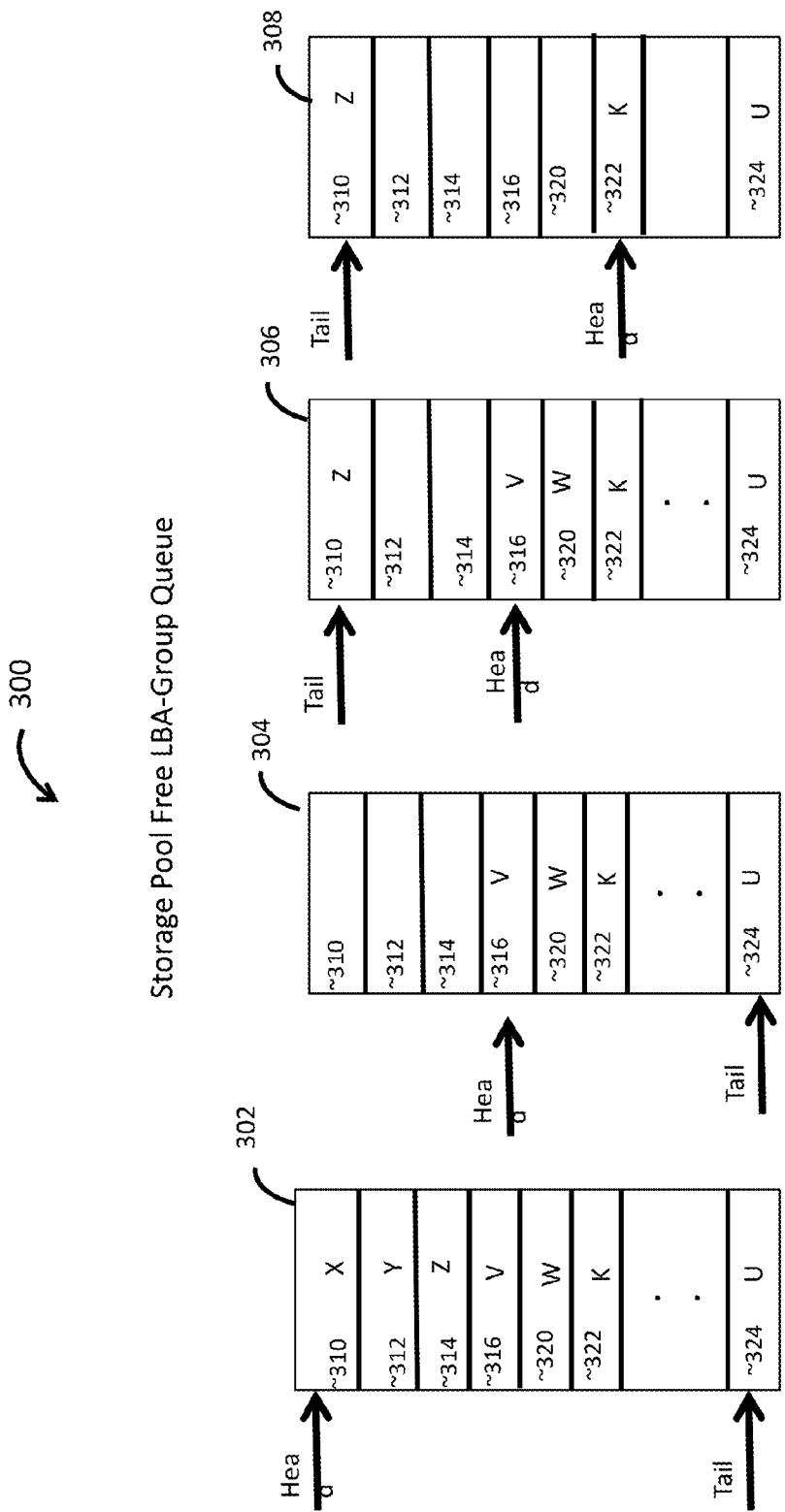

FIG. 3 shows an example 300 of a storage pool free LBA-group queue 302, typically constructed during the initial installation of the storage appliance 8 and storage pool 26. The storage processor 10 maintains a list of free LBA-groups within the storage pool 26 (also herein referred to as "storage pool free list") in the queue 302. The storage pool free LBA-queues 302-308 are the same table shown at a different stages going from the left side of the page to the right side of the page. The queue 302 is shown to have a head pointer and a tail pointer and each row, such as rows 310-324 including a free LBA-group. For example, in the row 310, the LBA-group 'X' is unassigned or free. Everytime, one or more storage pool LBA-groups are requested (being added to one or more LUNs) by the storage processor 10, the head pointer moves down the queue by one or more rows depending on the number of requested LBA-groups being requested. Everytime one or more storage pool LBA-groups become free, the tail pointer moves up in the queue by the number of LBA-groups that become available.

In the example 300, initially, all the storage pool LBA-groups 'X', 'Y', 'Z', 'V', 'W', 'K', and 'U' are available in the storage pool free list as shown by the queue 302. Thus, the head pointer points to the LBA-group 'X' 310, the first storage pool LBA-group in the table 302, and the tail pointer points to the last LBA-group, LBA-group 'U'. Next, shown by the queue 304, three LBA-groups are being requested by the storage processor because one or more LUNs are being added or LUNS are being expanded in size, thus, three of the storage pool free LBA-groups must be assigned to the LUNs LBA-group and are no longer free. The head pointer accordingly, moves down three rows to the row 316 where the next storage pool free LBA-group 'V' is saved and the rows 310-

314 have no available or free LBA-groups. Subsequently, as shown by the queue 306, the LBA-group 'Z' becomes free (unassigned) due to reduction in size, deletion, or migration of the LUN. Accordingly, the tail pointer moves up by one row to point to the row 310 and storage pool LUN-group 'Z' is saved in row 310. Finally, as shown by the queue 308, two more LBA-groups are requested, thus, the head pointer moves down by two rows, from the row 316, to the row 322 and the tail pointer remains in the same location. The LBA-groups 'V' and 'W' are no longer available.

The same information, i.e. maintaining the storage pool unassigned or free LBA-groups (also know as "storage pool free list"), may be conveyed in a different fashion, such as using a bit map. The bit map maps the storage pool LBA-groups to bits with each spatially representing a LBA-group.

Figure 4:
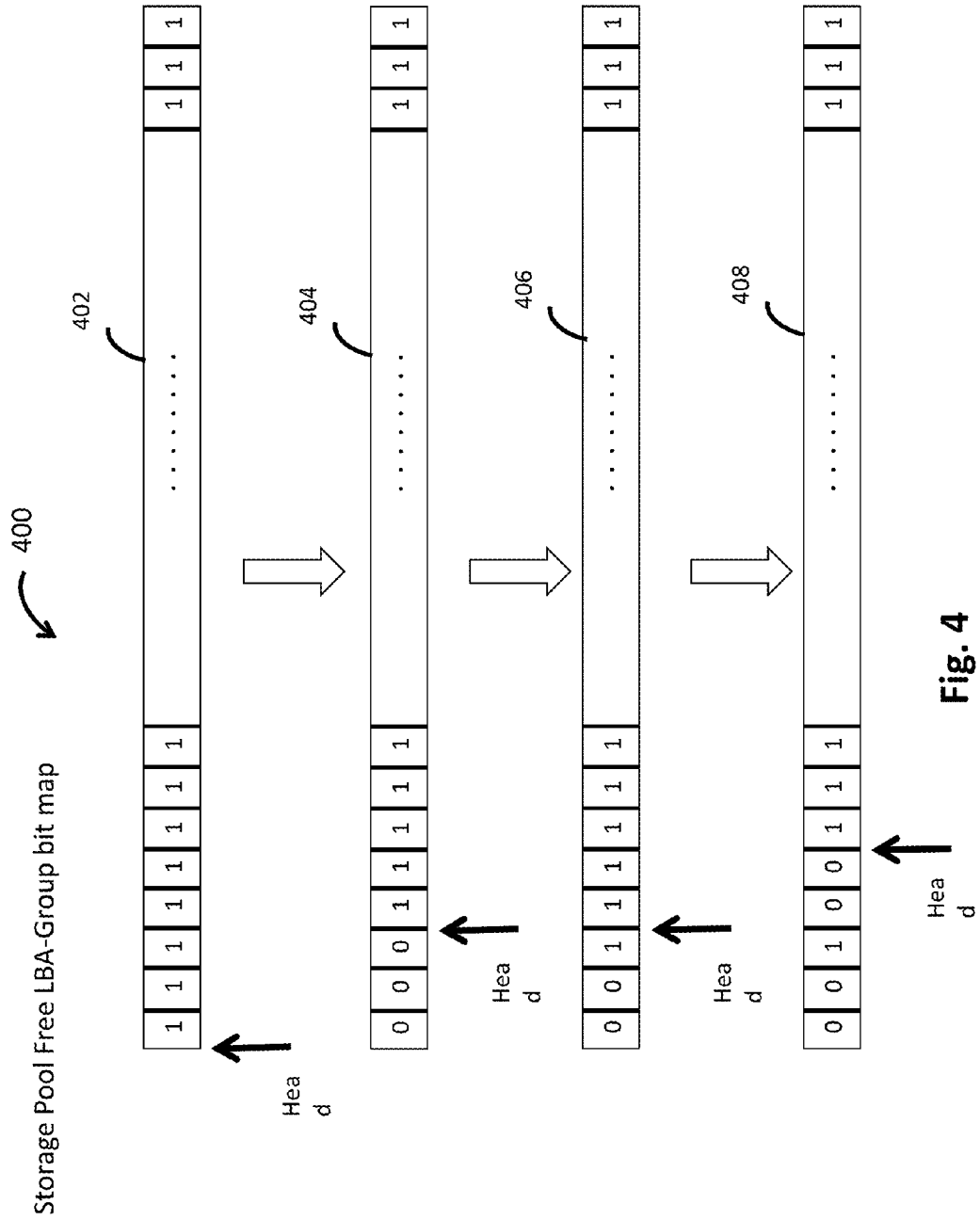
FIG. 4 shows an example of the storage pool free LBA-group bit map 400 consistent with the example of FIG. 3.

FIG. 4 shows an example 400 of the storage pool free LBA-group bit map 400 consistent with the example of FIG. 3. Storage processor 10 uses bit map to maintain the storage pool free list. Bit maps 402-408 are the same bit map but at different stages with the first stage shown by the bit map 402. Each bit of the bit maps 402-408 represents the state of a particular LBA-group within the storage pool as it relates to the availability of the LBA-group. The state of the bit map 400 is shown at 402-408. At 402, all of the LBA-groups are free, as also indicated at the start of the state of the queue 302. The head pointer points to the first bit of the bit map 402. A logical state of '1' in the example 400 of FIG. 4 represents an available or free LBA-group whereas a logical state '0' represents unavailability of the LBA-group. It is contemplated that a different logical state representation may be employed. The bit map 402 therefore shows availability, or not, of a LBA-group in a certain position, and not the LBA-group itself, as done by the queue 302. For instance, the LBA-group 'X' is not known to be anywhere in the bit map 402 but its availability status is known. Shown by the bit map 404, three free LBA-groups from the storage pool are assigned to one or more LUNs and are no longer free. Accordingly, the head pointer moves three bit locations to the right and bits associated with the assigned LBA groups are changed from state '1' to state '0' indicating that those LBA-groups are no longer free. Next, as shown by the bit map 406, one LBA-group becomes free and its bit position is changed to a logical state '1' from the logical state '0'. Next, as shown by the bit map 408, two LBA-groups are requested by the storage processor 10, thus, the next two free LBA-groups from the storage pool are assigned and the head pointer is moved two bit locations to the right with the two bits indicating unavailability of their respective LBA-groups. In one implementation of the invention, the head pointer only moves when LBA-groups are being assigned and become unavailable and not when LBA-groups are added, which is done in an attempt to assign the storage pool LBA-groups evenly. It is contemplated that different schemes for assigning LBA-groups from a bit map may be employed.

The queue 302 of FIG. 3 or the bit map 400 of FIG. 4 are two of many schemes that can be used by the storage processor 10 to readily access the storage pool free LBA-group (also known as "storage pool free list"). The storage pool free list is used to identify storage pool free LBA-groups when LBA-groups are being added to LUNs and the identified LBA-groups are removed from the storage pool free list. The identified storage pool LBA-groups are associated with the added LBA-groups in the mapping table 204 by adding the identified storage pool LBA-groups to the mapping table 204, which is indexed by the LBA-groups being added. When LBA-groups are being removed from a LUN, the storage pool LBA-groups associated with the LUN LBA-groups being removed are identified and disassociated or unassigned from the LUN mapping table 204 by removing the LBA-groups being removed from the table and adding them to the storage pool free list.

The queue 302 of FIG. 3 and/or the bit map 402 of FIG. 4 may be saved in the memory 20, in an embodiment of the invention. In some embodiments, they are saved in the non-volatile part of the memory 20.

FIG. 5 shows LUN table pointer and LUNs mapping table for the example of FIGS. 3 and 4. In FIG. 5, the LUN table pointer 502 is analogous to the table 202 of FIG. 2 and each of the tables of the LUN mapping tables 512 is analogous to the table 204 of FIG. 2. "LUN mapping table (or tables)" and "mapping table (or tables)" are used synonymously herein. Each entry of the LUN table pointer 502 points to a starting location of a particular mapping table in memory 20. For example, 'A' in the first row 550 of the table 502, which is associated with LUN 1, points to starting location of LUN 1 mapping table 514 and 'B' in the second row of the table 502, associated with LUN 2, points to the LUN 2 mapping table 518.

Using the example of FIGS. 3 and 4, three LBA-groups are being requested in association with LUN1. Three is based on the size of the LUN being created and size of the LBA-group. Accordingly, upon requesting three LBA-groups by the storage processor 10, LBA-groups 'X', 'Y', and 'Z' are assigned to LUN 1 LBA-group 0, 1, and 2 respectively from the storage pool free LUN-group queue. LUN1 mapping table 514 is updated accordingly with the rest of the rows of the table 514 having a 'Null' value signifying the LUN 1 LBA-groups that are not yet in use and not yet assigned a LBA-group from the storage pool. Then, due to a LUN resizing process, LUN1 is releasing LUN1 LBA-group 2 and therefore the storage pool LBA-group 'Z' associated with LUN1 LBA-group is added back to the pool of free LBA-groups. Namely, the LBA-group 'Z' is added changing the table 516 by removing the LBA-group Z from row 524 and instead indicating this row as not being assigned, or having a 'Null' value. Next, LUN2 is created with two LBA-groups. Storage processor 10 requests two LBA-groups from the storage pool. Two more free LBA-groups, i.e. LBA-groups 'V' and 'W', from storage pool free LBA-group queue are identified and assigned to LUN 2 LBA-group 0 and LBA-group 1 and, LUN 2 mapping table 518 is updated with the LUN LBA-group 0 542 having a value 'V" and the LUN LBA-group 1 544 having a value 'W'.

LBA-group granularity is typically determined by the smallest chunk of storage from the pool that is either allocated or assigned to a LUN. For example, if users are assigned 5 GB at a given time and no less than 5 GB, the LBA-group granularity is 5 GB. All assignments of storage space to the users would have to be in 5 GB increments. If only one such space is allocated and assigned to a LUN, the number of LBA-groups from the storage pool would be one and the size of the LUN would be 5 GB. As will be discussed later, the size of the mapping tables and hence amount of memory 20 that is being allocated for maintaining these tables are directly related to the size/granularity of the LBA-groups.

Figure 6:
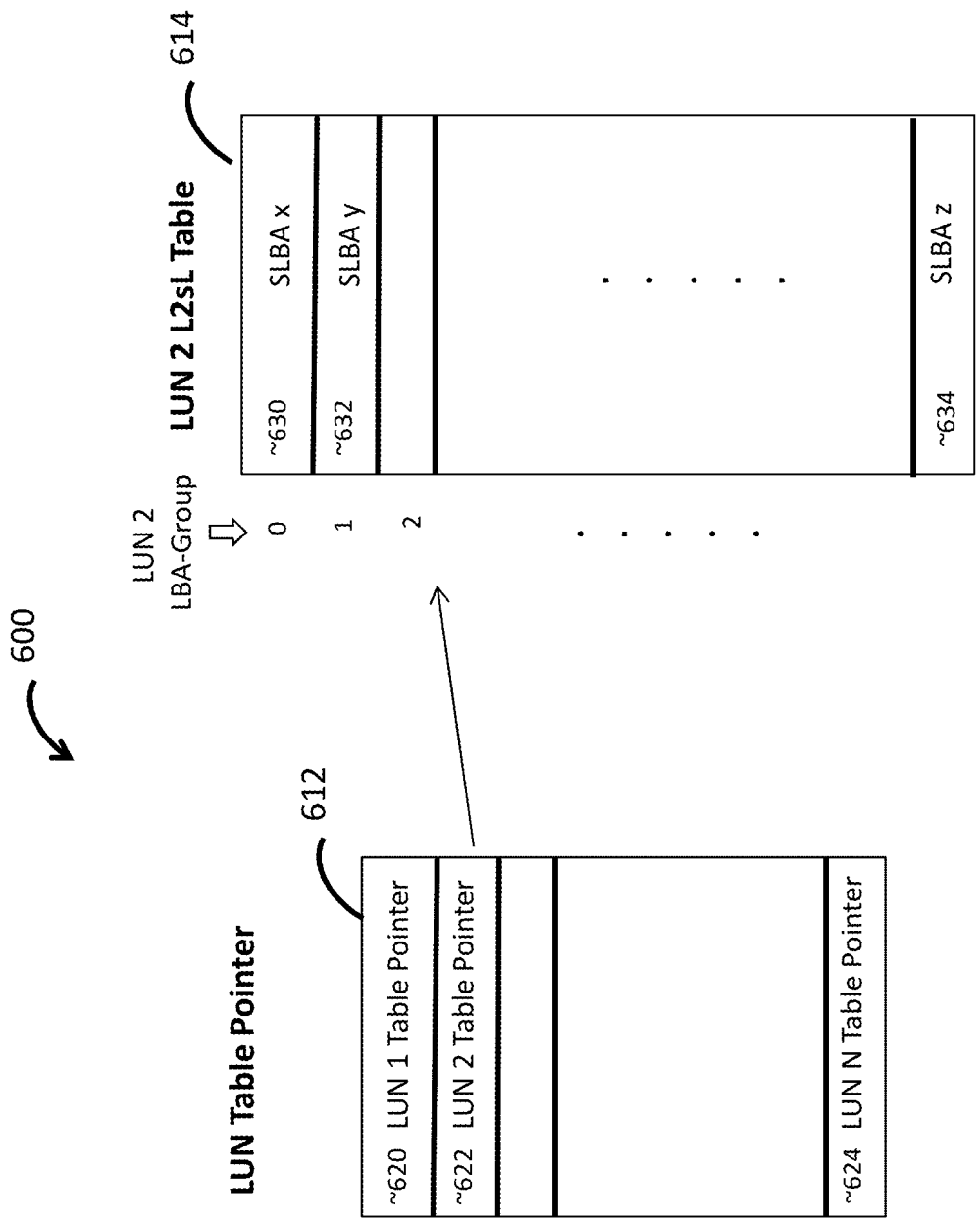
FIG. 6 shows exemplary tables 600, in accordance with another method and apparatus of the invention.

FIG. 6 shows exemplary tables 600, in accordance with another method and apparatus of the invention. Tables 600 are shown to include a LUN table pointer 612 and a LUN 2 L2sL table 614. The table 614 is an example of a mapping table discussed above. Also as previously discussed, the LUN table pointer 612 maintains a list of pointers with each pointer associated with a distinct LUN and pointing to the starting location of a distinct table in the memory 20, in this example, the table 614. Each LUN has its own L2sL table. The table 614 maintains the location of SSD LBAs (or "SLBAs") from the storage pool 26 associated with a LUN. For example, in row 630 of table 614, the SSD LBA 'x' (SLBA 'x') denotes the location of the LBA within a particular SSD of the storage pool assigned to LUN 2 LBA-group. The SSD LBAs are striped across the bank of SSDs of the storage pool 26 and further discussed in related U.S. patent application Ser. No. 14/040,280, by Mehdi Asnaashari, filed on Sep. 27, 2013, and entitled "STORAGE PROCESSOR MANAGING SOLID STATE DISK ARRAY", which is incorporated herein by reference. Striping the LBA-groups across the bank of SSDs of the storage pool 26 allows near even wear of the flash memory devices of the SSDs and prolongs the life and increases the performance of the storage appliance.

In some embodiments of the invention, when users initially create LUNs of different sizes, the storage processor 10 does not assign any portions of the storage pool 26 to the LUNs at the time they are created. The storage processor 10 first verifies against the number of LUNs not exceeding the maximum number of LUNs allowed in the storage system. It also verifies against the total size of LUNs not exceeding the size of the storage pool. In either of those events, it will notify the user and abort the process. Otherwise, it creates mapping tables for the LUNs in the system memory 20 and updates the mapping table pointer entries with starting locations of the mapping tables. The storage processor 10 at this point does not assign any portions of the storage pool 26 to the LUNs. Once the user tries to access a LUN, the storage processor 10 identifies the LBA-groups being accessed and only then assigns portions of the storage pool 26 to each LBA-group of the LUN being accessed. The storage processor 10 subsequently maintains those relationships in the mapping table 22. An advantage with this approach is striping across the SSDs is realized.

In subsequent accesses of the LUN LBA-groups that have already been associated with LBA-groups of the storage pool, the storage processor 10 identifies them as previously accessed LBA-groups and uses their associated storage pool LBA-group for further accesses.

In one embodiment of the invention, in subsequent write accesses of the LUN LBA-groups that have already been associated with LBA-groups of the storage pool, the storage processor 10 identifies new free storage pool LBA-groups, re-assigns them to the LUN LBA-groups, and updates the mapping table corresponding to the LUN accordingly.

In some embodiment of the invention, the size of the LBA-group or granularity of the LBA-groups (also herein referred to as "granularity") is similar to the size of a page in flash memories or the size of input/output (I/O) or commands that the storage system is expected to receive.

In another embodiment of the invention, the storage processor 10 maintains a SSD free list (also referred to as "unassigned SSD LBAs" or "unassigned SLBAs") per each SSD. The SSD free list is used to identify free LBA-groups within each SSD of the storage pool 26.

As used herein "storage pool free LBA-group" is used synonymously with "storage pool free list" and "SSD free LBA group" is used synonymously with "SSD free list", and "size of LBA-group" is used synonymously with "granularity of LBA-group" or "granularity" or "striping granularity".

An entry from the head of each SSD free list creates a free stripe that is used by the storage processor 10 for assignment. Once the storage processor 10 exhausts the current free stripe, it creates another free stripe for assignment, To prevent uneven use of one or more of the SSDs, host write commands are each divided into multiple sub-commands based on the granularity or size of the LBA-group and each of the sub-commands is mapped to a free LBA-group from each SSD free list therefore causing distribution of the sub-commands across the SSDs, such as PCIe SSDs.

When the storage processor 10 receives a write command associated with a LUN and the LUN's associated LBAs, it divides the command into one or more sub-commands based on the LBA size and the granularity or size of the LBA-group. Storage processor 10 determines if the LBA-groups associated with the sub-command have already been assigned to a LUN-group from the storage pool 26, or not. The LUN LBA-groups that have not been already assigned are associated with a LBA-group from a storage pool free list and the associated LUN mapping table 22 is updated accordingly to reflect this association. The LBAs, at the granularity or size of the LBA-groups is used to index through the mapping table 22.

In one embodiment of the invention, once a LUN LBA-group is assigned to a storage pool LBA-group, it will not be reassigned to another storage pool LBA-group. The storage processor 10 uses previously assigned storage pool LBA-group for re-writes to the LUN LBA-group.

In another embodiment of the invention, the storage processor 10, regardless of whether or not some of the LBA groups being written to have already been assigned to the LBA-groups from the storage pool, are all assigned to free LBA-groups from a free stripe. The storage pool LBA-groups associated with the LUN LBA-groups that had already been assigned are returned to the free list and added to the tail of the storage pool free LBA-group queue. Assigning all of the LUN LBA-groups being re-written to free LBA-groups from a free stripe even if some of the LUN LBA-groups had already been assigned causes striping of the sub-commands across a number of SSDs. This occurs even when the LUN LBA-groups are being re-written to and causes substantially even wear of the SSDs and increase in the performance of the storage system 8.

In one embodiment of the invention, PCIe SSDs are PCIe NVMe SSDs and the storage processor 10 serves as a NVMe host for the SSDs in the storage pool 26. The storage processor 10 receives a write command and corresponding LBAs form the host 12, divides the command into sub-commands based on the number LBAs and the size of LBA-group, with each sub-command having corresponding LBA-group. The storage processor 10 then assigns a free LBA-group from the storage pool free list and assigns the free LBA-group to the LBA-group of each sub-command and creates the NVMe command structures for each sub-command in the submission queues of corresponding PCIe NVMe SSDs. In another embodiment of the invention, the storage processor 10 assigns a free LBA-group from the storage pool free stripe and assigns the free LBA-group to the LBA-group of each sub-commands therefore causing striping of the sub-commands across the SSDs of the storage pool 26. Storage processor 10 then creates the NVMe command structures for each sub-command in the submission queues of corresponding PCIe NVMe SSDs using the associated storage pool LBA-group as "Starting LBA" and size of the LBA-group as the "Number of Logical Blocks".

In an embodiment of the invention, the storage processor 10 receives a write command and associated data form the host 12, divides the command into sub-commands and associates the sub-commands with a portion of the data ("sub-data"). A sub-data belongs to a corresponding sub-command. The data is stored in the memory 20.

In another embodiment of the invention, the storage processor 10 receives a read command and associated LBAs and LUN form the host 12, divides the read command into sub-commands based on the number LBAs and the size of LBA-group, with each sub-command having corresponding LBA-group. The storage processor 10 then determines the storage pool LBA-groups associated with the LUN LBA-groups and creates the NVMe command structures for each sub-command and saves the same in the submission queues of corresponding PCIe NVMe SSDs using the associated storage pool LBA-group as "Starting LBA" and size of the LBA-group as "Number of Logical Blocks". In the event no storage pool LBA-groups that are associated with the LUN LBA-groups is found, a read error is announced.

In some embodiments, host LBAs from multiple commands are aggregated and divided into one or more sub-commands based on the size of LBA-group. In some embodiments, the multiple commands may have some common LBAs or consecutive LBAs. Practically, the host LBA of each command rather than the command itself is used to create sub-commands. An example of the host LBA is the combination of the starting LBA and the sector count. The host LBA of each command is aggregated, divided into one or more LBAs based on the size of the LBA-group, with each divided LBA being associated with a sub-command. In an exemplary embodiment, the host LBA of a command is saved in the memory 20.

In other embodiment of the invention, storage processor 10 creates the NVMe command structures for each sub-command in the submission queues, such as the submission queues 24, of the corresponding SSDs with each structure pointing to a sub-data. By using NVMe PCIe SSDs to create the storage pool 26, the storage system or appliance manufacturer need not have to allocate resources to design its own SSDs for use in its appliance and can rather use off-the-shelf SSDs that are designed for high throughput and low latency. Using off-the-shelf NVMe SSDs also lowers the cost of manufacturing the storage system or appliance since multiple vendors are competing to offer similar products.

In yet another embodiment of the invention, the host data associated with a host write command is stored or cached in the non-volatile memory portion of the memory 20. That is, some of the non-volatile memory portion of the memory 20 is used as a write cache. In such a case, completion of the write command can be sent to the host once the data is in the memory 20, prior to dispatching the data to the bank of NVMe PCIe SSDs. This can be done because the data is saved in a persistent memory hence the write latency is substantially reduced allowing the host to de-allocate resources that were dedicated to the write command. Storage processor 10, at its convenience, moves the data from the memory 20 to the bank of SSDs 26. In the meanwhile, if the host wishes to access the data that is in the write cache but not yet moved to bank of NVMe PCIe SSDs 26, the storage processor 10 knows to access this data only from the write cache. Thus, host data coherency is maintained.

In another embodiment of the invention, the SSD free list or storage pool free list, mapping tables, as well as the submission queues are maintained in the non-volatile portion of the memory 20. As a result, these queues and tables retain their values in the event of power failure. In another embodiment, the queues and/or table are maintained in a DRAM and periodically stored in the bank of SSDs 26.

In yet another embodiment of the invention, when the storage processor 10 receives a write command, associated with a LUN whose LBA-groups has been previously been written to, the storage processor 10 assigns new LBA-groups from the storage pool free list (to the LBA-groups being written to) and updates the mapping table accordingly. It returns the LBA-groups from the storage pool that were previously associated with the same LUN back to the tail of the storage pool free list for use thereafter.

In cases where a large storage space is employed, because a mapping table need be created for each LUN and each LUN could potentially reach the maximum LUN size allowed, there would be a large number of tables with each table having numerous entries or rows. This obviously undesirably increases the size of memory 20 and drives up costs. For example, in the case of 3,000 as the maximum number of LUNs allowed in the storage appliance, with each LUN having a maximum LBA size of 100,000 and a LBA-group size of 1,000, 3,000, mapping tables need to be maintained with each table having (100,000/1,000)=100 rows. The total memory size for maintaining these tables is 300,000 times the width of each entry or row. Some, if not most, of the 100 entries of the mapping tables are not going to be used since the size of most all the LUNs will not reach their maximum LUN size allowed in the storage appliance. Hence, most of the entries of the mapping table will contain 'Null' values.

To reduce the memory size, an intermediate table, such as an allocation table pointer is maintained. The size of this table is the maximum LUN size divided by an allocation size. The allocation size similar to LBA-group size is determined by the manufacturer based on design choices and is typically somewhere between the maximum LUN size and the LBA-group size. For an allocation size of 10,000, the maximum number of rows for each allocation table pointer is (100,000/10,000)=10 and the number of rows for the mapping table associated with each allocation table pointer row is the maximum LUN size divided by the allocation size (10,000/1,000)=10. Storage processor 10 creates an allocation table having 10 rows when a LUN is created. The storage processor 10 then calculates the maximum number of allocation table pointer rows required for the LUN, based on the size of the LUN that is being created and the allocation size. The storage processor 10 creates a mapping table for each of the calculated allocation table pointer rows. For example, if the size of the LUN being created is 18,000 LBAs, the actual number of allocation table pointer rows required is the LUN size divided by the allocation size (18,000/10,000)=1.8 and rounded to 2 rows. As such, the storage processor need only create two mapping table of 10 rows, with each row associated with the two allocation table pointer entrees required for the LUN actual size. As such, the storage processor need not create a large mapping table initially to accommodate the maximum LUN size. It creates the mapping tables close to the actual size of the LUN and not the maximum size allowed for a LUN. Yet, the allocation table pointer has enough entries to accommodate the LUNs that do actually grow to the maximum size allowed but the size of the mapping table closely follows the actual size of the LUN.

Figure 7:
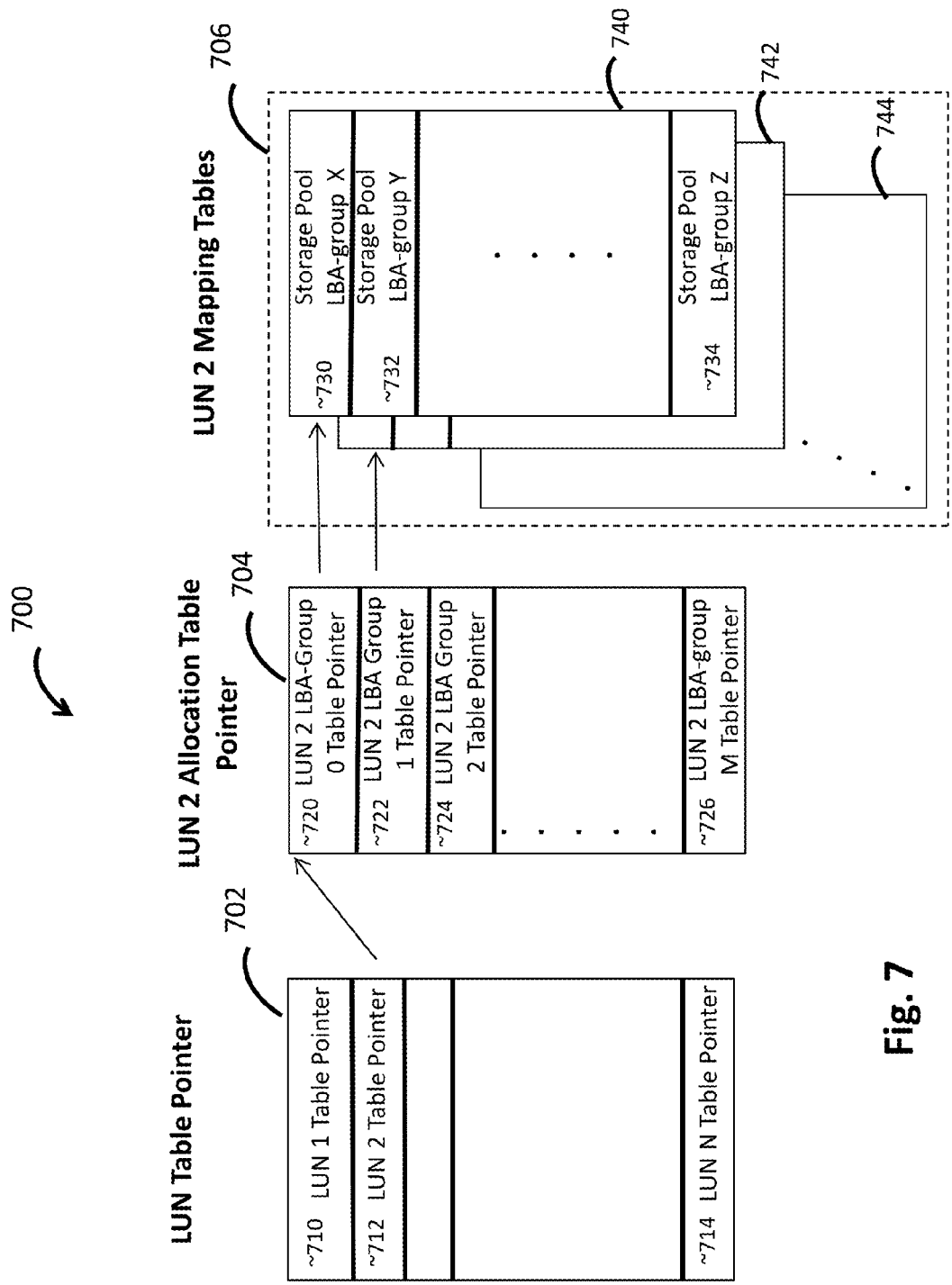
FIG. 7 shows an example of table 700 including an allocation table pointer.

FIG. 7 shows an example of table 700 including an allocation table pointer 704. In FIG. 7, the tables 700 are the LUN table pointer 702, which is analogous to the LUN table pointer 202 of FIG. 2, a LUN 2 allocation table pointer 704, and a LUN 2 mapping tables 706. The pointers 712 of the LUN table pointer 702 points to a LUN 2 allocation table pointer 704 rather than the mapping table 706 and the entries of the LUN 2 allocation table pointer points to a smaller mapping tables 740, 742 thru 744 associated with the allocation table pointer entries. It is noted that the example of FIG. 7 uses LUN 2 for demonstration with the understanding that other LUNs may be employed. In an embodiment of the invention, the allocation table pointer 704 is maintained in the memory 20.

In FIG. 7, the pointer in row 712 of table 702 points to the LUN 2 allocation table pointer 704. Each row of the allocation table pointer 704 points to the starting address of the mapping table associated with that row. In the example of FIG. 7, all the mapping tables 740 through 744 being pointed by the rows 720 through 726 are associated with LUN2. The content of row 720 is then used to point to a memory location of the mapping table 740 and the content of row 722 points to a memory location of the mapping table 742 and so on. The number of valid entrees in the allocation table pointer 704 is based on the actual size of the LUN and the granularity or size of the allocation tables and the number of mapping tables in 706 depends on the number of valid entries in the LUN 2 allocation table 704. Non-valid entries in the LUN 2 allocation table 704 will have 'Null" value and will not have an associated mapping table.

FIG. 8 shows exemplary tables 800, analogous to the tables 600 except that the tables 800 also include an allocation table. The tables 800 are shown to include a LUN table pointer 802, a LUN 2 allocation table 804, and LUN 2 L2sL tables 806. Each of the entries of the table 802 points to the starting location of a particular LUN allocation table. In the example of FIG. 8, the entry in row 812 of the table 802 points to the starting location of LUN 2 allocation table pointer 804. Each entry in the rows 820-826 of the table 804 points to a starting location of the L2sL tables 840, 842 through 844.

FIGS. 9-12 each show a flow chart of a process performed by the CPU subsystem 14, in accordance with methods of the invention.

Figure 9:
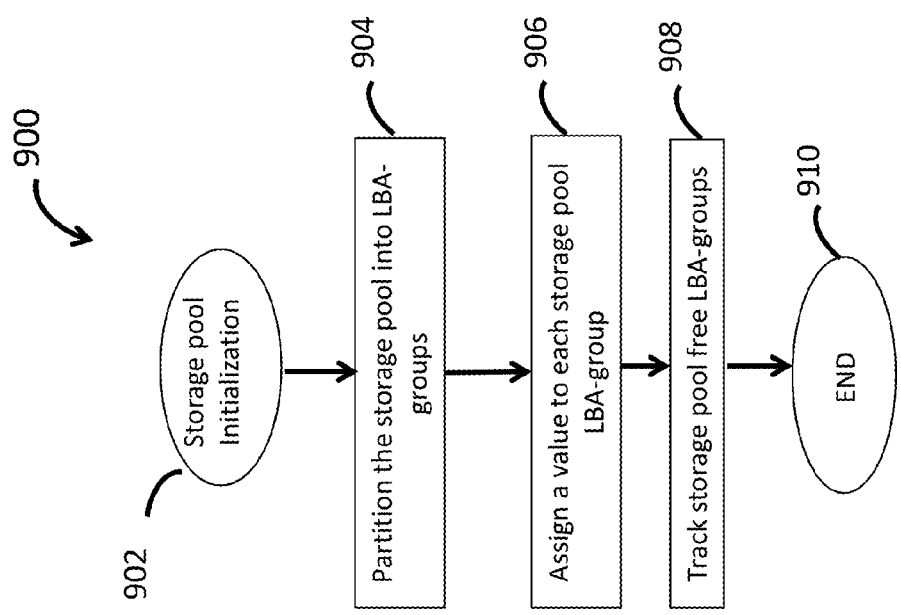

FIG. 9 shows a flow chart 900 of the steps performed in initializing the storage pool 26, in accordance with a method of the invention. At 902, the storage pool 26, begins to be initialized. At step 904, the storage pool is partitioned into LBA-groups based on the granularity or size of the LBA-group. Next, at step 906, a value is assigned to each storage pool LBA-group, and at step 908, the available (or free) LBA-groups (storage pool free list) are tracked using queues, such as shown and discussed relative to FIG. 3 or using bit maps, such as shown and discussed relative to FIG. 4. The process ends at step 910.

Figure 10:
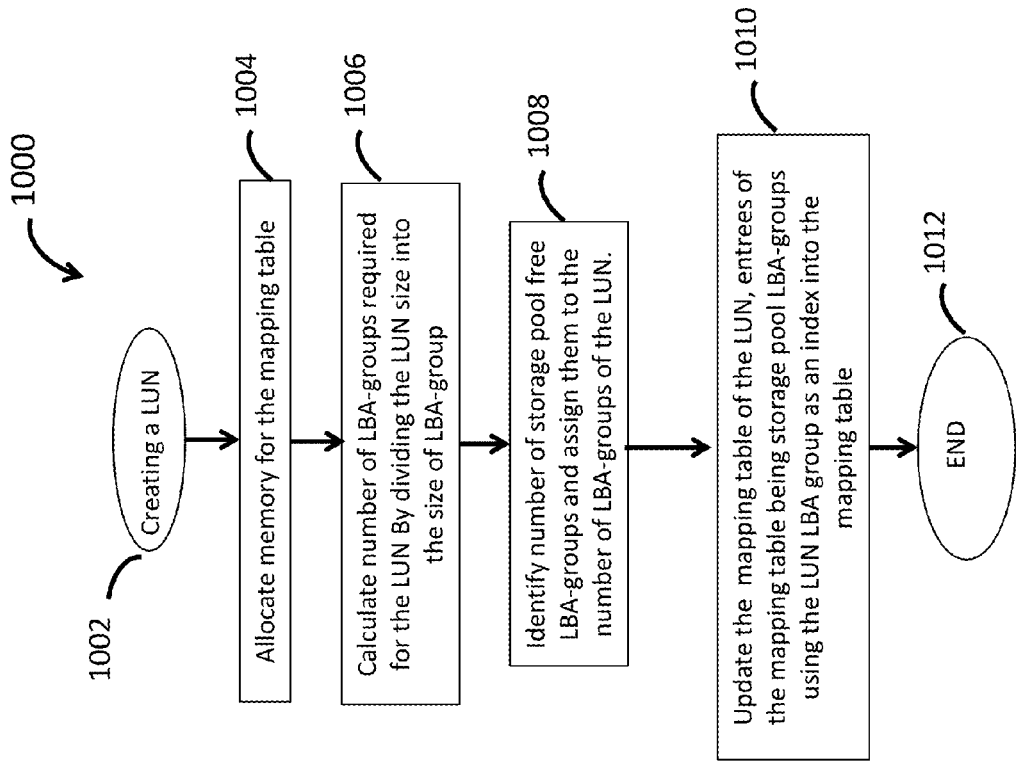

FIG. 10 shows a flow chart 1000 of the steps performed in creating LUNs, in accordance with a method of the invention. At 1002, the process of creating a LUN begins. At step 1004, memory is allocated for the mapping table. At step 1006, the number of LBA-groups required for the LUN is determined by dividing the size of the LUN by the size of the LBA-group. At 1008, the number of free LBA-groups from the storage pool calculated at step 1006 is identified and assigned to the LUN LBA-groups. Next, at step 1010, the mapping table of the LUN that is being created is updated with the entries of the mapping table reflecting the association of the storage pool LBA-groups to the LUN LBA-groups using the LUN LBA-group as an index into the mapping table. The process ends at step 1012.

In some embodiment of the invention, the storage processor verifies against the number of free LBA-groups in the storage pool and terminates the process prematurely if there are not enough free LBA-groups to assign to the LUN being created.

Figure 11:
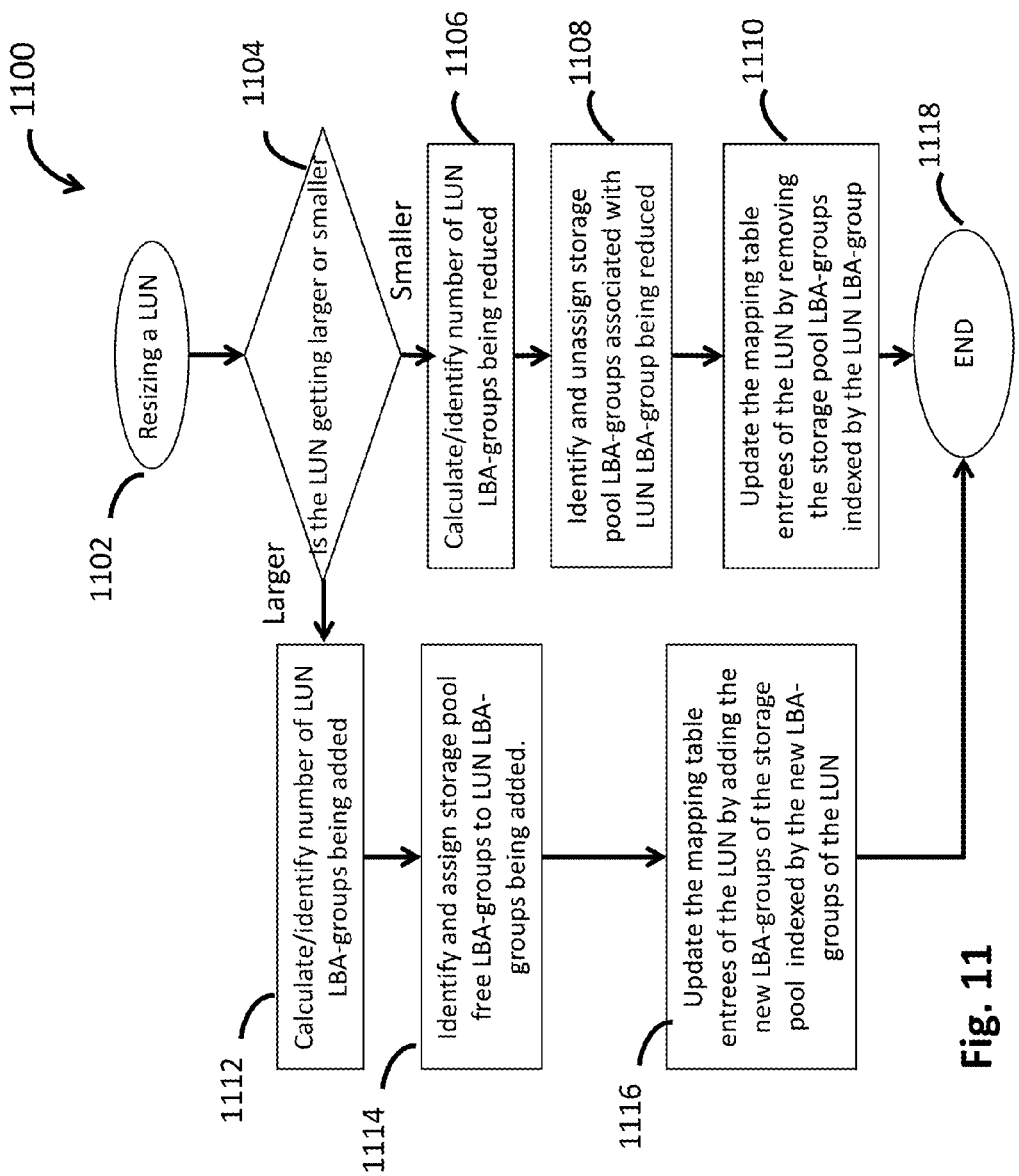

FIG. 11 shows a flow chart 1100 of the steps performed in resizing a LUN, in accordance with a method of the invention. At 1102, the process of resizing a LUN begins. At 1104, a determination is made as to whether or not the LUN is to become larger or smaller. In the case of the latter, the process continues to step 1106 where the number of LUN LBA-groups being reduced is identified. Next, at step 1108, the storage pool LBA-groups that are associated with the LUN LBA-group being reduced are identified and unassigned. The identified LBA-groups are added to the tail of free LBA-group queue. Next, at step 1110, the mapping table of the LUN is updated by removing the storage pool LBA-groups associated to the LUN and indexed by the LUN LBA-group replacing it with a 'Null' value and the process ends at 1118.

If the LUN is to be made larger, the process goes from 1104 to the step 1112 wherein the number of LUN LBA-groups that are being added is identified. Next, at step 1114, the free or available LBA-groups of the storage pool is identified and assigned to the LUN LBA-groups being added. Next, at step 1116, the mapping table is updated with the entrees thereof of the LUN by adding the new LBA-groups of the storage pool 26 identified (or indexed) by the new LBA-groups of the LUN to the mapping table. The process ends at 1118.

In some embodiment of the invention, the storage processor 10 may check the number of free LBA-groups in the storage pool 26 to terminate the process prematurely if there are not enough free LBA-groups to assign to the LUN getting larger.

In some embodiment of the invention, the storage processor 8 places a restriction for the maximum size of a LUN based on its resources and the storage processor 10 may check the new size of the LUN when the LUN is getting larger or being created to determine the size doesn't exceed the maximum LUN size allowed by the storage system 8. In the event when the size of the LUN is exceeding the maximum LUN size allowed, the storage processor terminates the LUN creation or LUN enlargement process.

In another embodiment, the storage processor 8 places a restriction for the maximum number of a LUNs allowed in the storage system based on its resources and the storage processor 10 checks the number of LUNs when a new LUN is created to determine the number of LUNs doesn't exceed the maximum number of LUNs allowed by the storage system. In the event when the number of LUNs is exceeding the maximum number allowed, the storage processor terminates the LUN creation process.

In yet another embodiment, the storage processor 10 may check the total size of all LUNs when a new LUN is created or getting larger to determine the total size of all the LUNs doesn't exceed the size of the storage pool 26. Storage processor 10 tracks the number of assigned LBA-groups or alternatively, unassigned LBA-groups within the storage pool and provides mechanism to inform the user when the number of free LBA-groups within the storage pool is about to exhaust.

Figure 12:
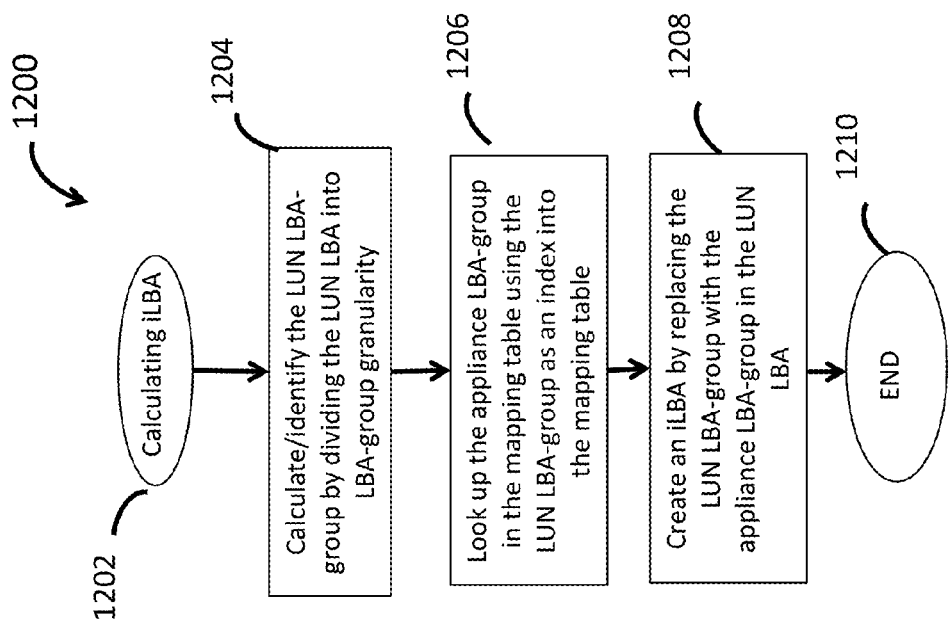

FIG. 12 shows a flow chart 1200 of the steps performed in determining an intermediary LBA (iLBA) or storage pool LBA, in accordance with a method of the invention. At 1202, the iLBA calculation process starts. Next, at step 1204, the LUN LBA-group is calculated or identified by dividing the LUN LBAs; associated with a command, into a LBA-group granularity. At step 1206, the storage pool LBA group is identified by using the LUN LBA-group as an index into the mapping table. Next, at step 1208, an iLBA is created by replacing the LUN LBA-group portion of the LUN LBA with the storage pool LBA-group and the process ends at step 1210.

Although the invention has been described in terms of specific embodiments, it is anticipated that alterations and modifications thereof will no doubt become apparent to those skilled in the art. It is therefore intended that the following claims be interpreted as covering all such alterations and modification as fall within the true spirit and scope of the invention.

What is claims is:

1. A method of managing logical unit numbers (LUNs) in a storage system, the storage system including a storage pool made of solid state storages (SSDs) comprising:

receiving a write command with an associated starting logical block address (LBA), a number of sectors, and a LUN and associated data to be stored in the storage pool, from a host;

maintaining a mapping table, by a storage processor, into which is saved and tracked the relationship between portions of the storage pool and LUN LBA-groups, portions of the storage pool defined by storage pool LBA-groups, one of a plurality of pointers being used to identify a starting location of the mapping table in a memory located in the storage processor and externally to the SSDs, the mapping table being indexed by the LUN LBA-groups and each entry of the mapping table identifying the storage pool LBA-group that is assigned to the corresponding LUN LBA-group used to index the entry;

identifying one or more LUN LBA-groups being affected;

using the relationships saved in the mapping table, storing the host data in various portions of the storage pool, each of the various portions identified by storage pool LBA-groups identifying non-continuous portions in the storage pool that appear to the host to be continuous; and maintaining table pointers for each existing LUN, a table pointer identifying a range of addresses in the mapping table associated with a distinct and existing LUN.

2. The method of managing LUNs, as recited in claim 1, wherein the storage pool LBA-groups are the same size as the LUN LBA-groups.

3. The method of managing LUNs, as recited in claim 1, further including allocating a portion of the storage pool to the affected LUN LBA-groups.

4. The method of managing LUNs, as recited in claim 3, further including identifying storage pool LBA-groups from a storage pool free list.

5. The method of managing LUNs, as recited in claim 4, wherein upon writing to a previously-assigned LUN, forming a relationship between the previously-assigned LUN and a different storage pool LBA-group.

6. The method of managing LUNs, as recited in claim 3, further including tracking the relationship between the storage pool and the LUNs.

7. The method of managing LUNs, as recited in claim 1, further including resizing the storage pool LBA-groups by adding storage pool LBA-groups to the mapping table.

8. The method of managing LUNs, as recited in claim 7 wherein the resizing includes removing one or more storage pool LBA-groups from a storage pool free list.

9. The method of managing LUNs, as recited in claim 8, wherein when the storage pool LBA-groups are being removed, adding the removed storage pool LBA-groups to the storage pool free list.

10. The method of managing LUNs, as recited in claim 9, wherein upon removing a LUN adding the allocated portions of the storage pool to the storage pool free list.

11. The method of managing LUNs, as recited in claim 9, further including upon removing a LUN, removing the relationship from the mapping tables.

12. The method of managing LUNs, as recited in claim 1, further including creating a LUN and generating a mapping table when the LUN is created.

13. The method of managing LUNs, as recited in claim 1, further including removing a mapping table when a LUN is deleted.

14. The method of managing LUNs, as recited in claim 1, wherein the storage pool comprises one or more solid storage disks (SSDs) and further including maintaining a SSD free list comprising of free SSD LBA-groups for each of the one or more SSDs.

15. The method of managing LUNs, as recited in claim 1, further including allocating portions of a storage pool to a LUN only when the LUNs are being accessed for the first time.

16. A method of managing logical unit numbers (LUNs) in a storage system comprising:

during a write operation, initiated by a host to write data to a plurality of solid state storages (SSDs), receiving one or more LUNs, a LUN having a size determinate by the host;

allocating portions of a storage pool to a received LUN, the allocating defining a relationship between the storage pool and the received one or more LUNs;

maintaining the relationship in a mapping table, by a storage processor, into which is saved and tracked the relationship between portions of the storage pool and LUN LBA-groups, portions of the storage pool defined by storage pool LBA-groups, one of a plurality of pointers being used to identify a starting location of the mapping table in a memory located in the storage processor and externally to the SSDs, the mapping table being indexed by the LUN LBA-groups and each entry of the mapping table identifying the storage pool LBA-group that is assigned to the corresponding LUN LBA-group used to index the entry;

identifying one or more LUN LBA-groups being affected;

using the relationships saved in the mapping table, storing the host data in various portions of the storage pool, each of the various portions identified by storage pool LBA-groups identifying non-continuous portions in the storage pool that appear to the host to be continuous; and maintaining table pointers for each existing LUN, a table pointer identifying a range of addresses in the mapping table associated with a distinct and existing LUN.

17. The method of managing LUNs, as recited in claim 1, further including a resizing step including using the pointers in addition to using the mapping tables to resize the storage pool LBA-groups.

18. The method of managing LUNs, as recited in claim 1, wherein the size of the mapping table changing based upon the LUNs and the size of the number of table pointers remaining the same.

19. The method of managing LUNs, as recited in claim 1, wherein resizing the storage pool LBA-groups including adding, removing or migrating the LUNs.

20. The method of claim 19, further including only creating a mapping table when a LUN is being added.

21. The method of claim 19, further including resizing at a granularity.

* * * * *